(12) United States Patent
Rajagopalan (10) Patent No.: US 9,747,194 B2
(45) Date of Patent: Aug. 29, 2017

(54) SYSTEMS AND METHODS TO MAINTAIN CONSISTENCY BETWEEN SOFTWARE SPECIFICATION AND CODE

(71) Applicant: eBay Inc.

(72) Inventor: Shrivatsan Navalpakkam Rajagopalan, San Mateo, CA (US)

(73) Assignee: eBay Inc., San Jose, CA (US)

( * ) Notice: Subject to any disclaimer, the term of this patent is extended or adjusted under 35 U.S.C. 154(b) by 120 days.

(21) Appl. No.: 13/663,956

(22) Filed: Oct. 30, 2012

(65) Prior Publication Data

US 2014/0123107 A1 May 1, 2014

(51) Int. Cl.
*G06F 11/36* (2006.01)

(52) U.S. Cl.
CPC .................. *G06F 11/3684* (2013.01)

(58) Field of Classification Search
USPC .................. 717/120–123, 102–104
See application file for complete search history.

(56) References Cited

U.S. PATENT DOCUMENTS

| 7,370,315 | B1 * | 5/2008 | Lovell ....................... G06F 8/33 715/763 |
| 7,890,927 | B2 * | 2/2011 | Eldridge et al. ............. 717/110 |
| 8,561,014 | B2 * | 10/2013 | Mengusoglu et al. ........ 717/104 |
| 2008/0098349 | A1 * | 4/2008 | Lin ............................ G06F 8/10 717/106 |
| 2011/0271253 | A1 * | 11/2011 | Bnayahu et al. ............. 717/123 |
| 2012/0005156 | A1 * | 1/2012 | Grant .................. G06F 17/2288 707/608 |
| 2012/0192165 | A1 * | 7/2012 | Xu et al. ....................... 717/149 |

OTHER PUBLICATIONS

Geoffrey Sparks, Project Management with Enterprise Architect, 2010, Sparx Systems.*
Geoffrey Sparks, Getting Started With Enterprise Architect, 2010, Sparx Systems.*
Geoffrey Sparks, Code Engineering Using UML Models, 2010, Sparx Systems.*
Geoffrey Sparks, Baseline UML Models, 2010, Sparx Systems.*
Mojombo, "Say hello to the Network Graph Visualizer", Apr. 10, 2008, GitHub.*

* cited by examiner

*Primary Examiner* — Lewis A Bullock, Jr.
*Assistant Examiner* — Wynuel Aquino
(74) *Attorney, Agent, or Firm* — Schwegman Lundberg & Woessner, P.A.

(57) ABSTRACT

A method and a system to maintain consistency between software specification and code are described. A specification engine converts a specification describing features included in a piece of software into convened specification that describes the historical details of the features organized temporally. A code engine abstracts code corresponding to the specification into a design. An n-trace engine traces a portion of the converted specification that describes a particular feature of the one or more features to a portion of the design that includes the code that, when executed by one or more processors, implements the particular feature and generates a time-graph that sequentially orders events occurring in connection with the portion of the code.

19 Claims, 4 Drawing Sheets

SYSTEMS AND METHODS TO MAINTAIN CONSISTENCY BETWEEN SOFTWARE SPECIFICATION AND CODE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2012, All Rights Reserved.

TECHNICAL FIELD

The present application relates generally to the technical field of software testing and quality control and, in one specific example, to maintaining consistency between software specification and code.

BACKGROUND

Figure 1:
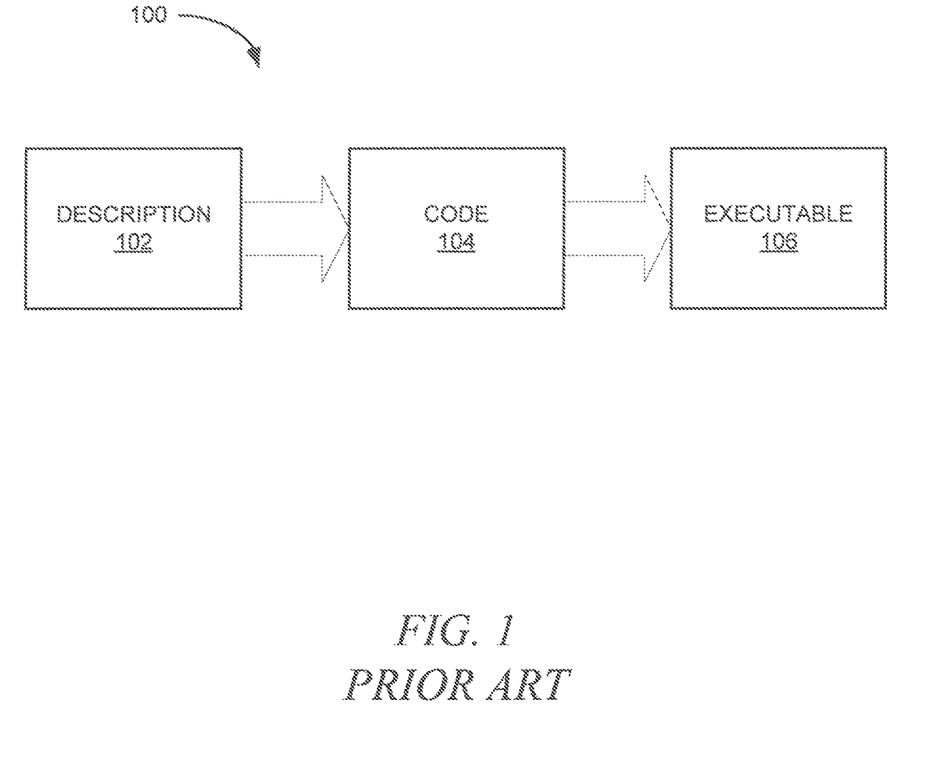
FIG. 1 depicts a flow describing a software creation process in the prior art.

When creating software code, a number of people work on various stages of the code. As depicted in FIG. 1, a flow 100 may be used. In the flow 100, a specification 102 (e.g., a product requirements document (PRD), an engineering requirements document (ERD), or user stories) is generated by a project manager. The specification 102 describes functions or operations to be performed by the code to be generated. The specification 102 may be a document written in a human-readable language. In some instances, the specification 102 may include a diagram depicting the architecture of the code or pieces of pseudo-code describing the desired code. The code 104 may be generated by a software developer according to the specification. The code 104 may be written in a software language such as Java, C++, or XML. The code 104 may be compiled to generate an executable 100. The executable 106 is machine-readable and used by quality assurance (QA) engineers to test the software for bugs and compliance to the specification.

BRIEF DESCRIPTION OF THE DRAWINGS

Some embodiments are illustrated by way of example and not limitation in the figures of the accompanying drawings in which.

DETAILED DESCRIPTION

Example methods and systems to maintain consistency between software specification and code are described. In the following description, for purposes of explanation, numerous specific details are set forth in order to provide a thorough understanding of example embodiments. If will be evident, however, to one skilled in the art that the present invention may be practiced without these specific details.

Software Development Life Cycle Models (SDLC) used to develop software may be different in various process areas within an organization. Examples of SDLC models include Agile and Waterfall. With increasing changes in technology stack, testing time is decreased. Examples of testing include combinatorial testing and load and performance (L&P) testing. With an increasing number and diversity of tools being used to engineer software, there is information scattering (a phenomenon where related and interlinked information is scattered throughout the enterprise systems).

In the present system, data related to testing is made accessible seamlessly and an ability to link the past and the present software artifacts is provided. The ability to link past artifacts to present artifacts is referred to as traceability. By providing traceability, software development may have lesser schedule slippage, better estimation, and a lower number of design violations. Design violations are aberrations made in the process of implementing the code from the specification.

One example challenge is in ensuring that the software which is deployed by a website addresses the business needs of the website. The process of ensuring if all the business features rules defined in the specification (e.g., specification 102) are included in the code (e.g., code 104) and from there on, to determine if the code covers known scenarios. Quality issues in code may arise from inter-domain dependencies, limited testing resources, schedule slippage, and a lapse of traceability between the specification and the code. Lapse of traceability is a potentially expensive issue when failures occur on the website leading to lost sales. Having traceability allows the root cause of bugs to be identified quickly and fixed quickly resulting in less downtime on the website.

Figure 2:
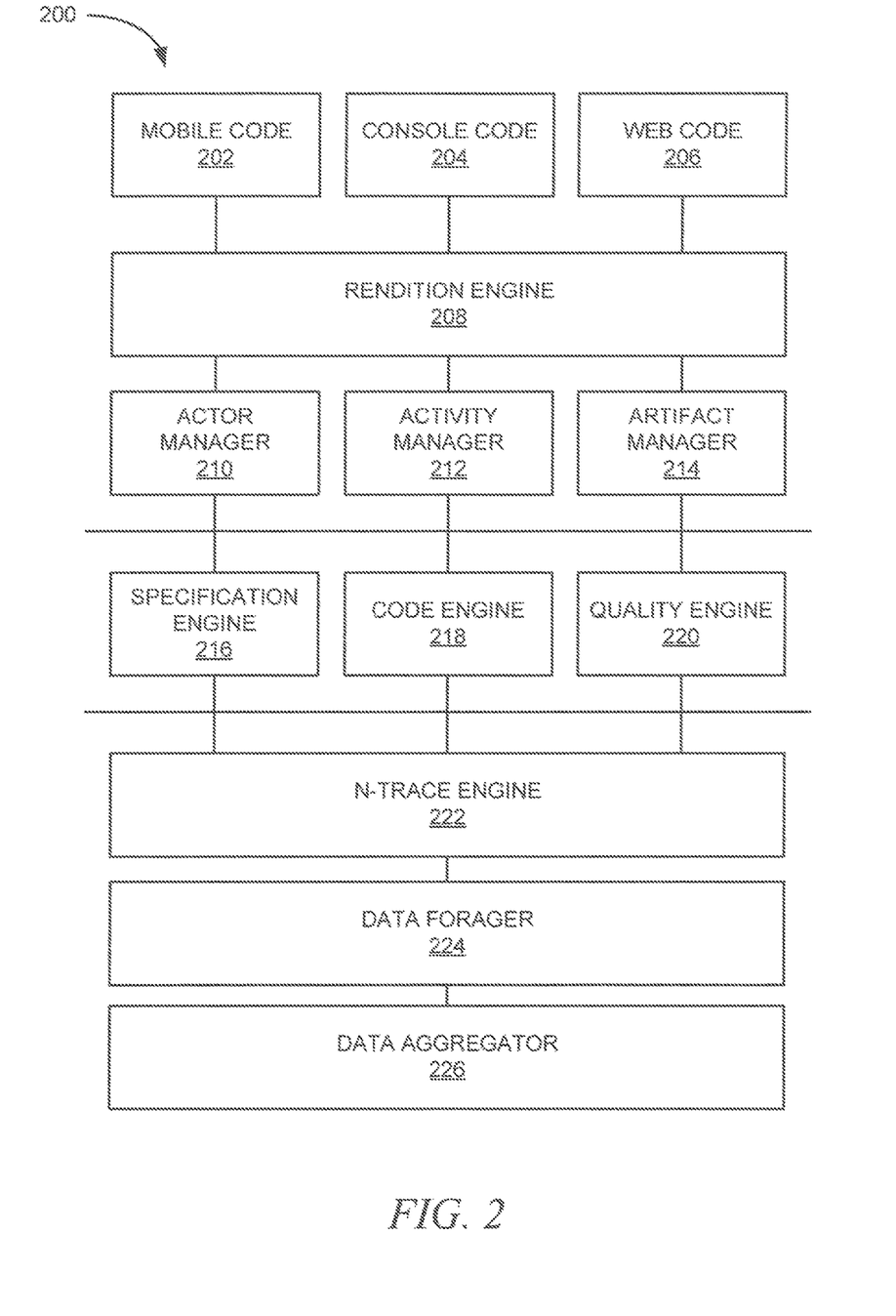
FIG. 2 is a block diagram of an example system, according to various embodiments.

FIG. 2 is a block diagram of an example system 2005 according to various embodiments. The system 200 may be implemented to and deploy new code within an e-commerce enterprise.

The e-commerce enterprise may generate code to be deployed for various platforms such as mobile, console (e.g., a command line interface), and web. Each platform may require separate code. In FIG. 2, the various sets of code are depicted as mobile code 202, console code 204, and web code 206. The sets of code may be untested, partially tested or tested OK.

A rendition engine 208 is configured to generate a visual representation or reproduction of the code. In some instances, the rendition engine 208 may generate a unified modelling language (UML) diagram of at least a portion of the mobile code 202, the console code 204, and/or the web code 206. The rendition engine 208 may include a new input/output (NIO)—a collection of Java programming language application programming interfaces (APIs) that offer features for intensive I/O operations (not shown). The rendition engine 208 may be a ReSTfull service implementation.

Code may be written in an object-oriented (OO) language or in a functional language. Code written in an object-oriented language may be used to generate a UML diagram or to update an existing UML diagram. Code written in a functional language (e.g., a procedural language) may be used to generate finite state machines (FSM) or a UML state diagram.

Managers collect, manage, and store data about entities associated with the code. The managers are modules that have domain specific intelligence to manage Actor, Artifact and Activity related data. An actor manager 210 is configured to manage data about the product managers, developers, and QA engineers who set on the code or specification. An activity manager 212 manages data about actions performed on the code or the specification. An artifact manager 214 manages artifacts and data describing artifacts. Artifacts include documents, reports, deliverables, code, specifications, and other work product used in software development, testing, and deployment.

The managers 210, 212, and 214 provide access to the stored data to one or more engines that process the stored data. For example, the N-Trace engine may access data from activity manager 212 and the actor manager 210 in order to connect the dots to answer questions such as: Who was the developer who created a piece of code that caused the Checkout Crash—costing us $500,000/-? The answer may be accessed via the actor manager 210. And when was this particular piece of code checked-in to the source control system and how many bugs were closed in this check-in? The answer may be accessed via the activity manager 212. Thus, the engines 216, 218, and 220 may access data from other modules too.

A specification engine 216 is configured to access specifications from the artifact manager 214 including PRDs, ERDs, and user stories. The specification engine 216 then converts the specification into an information exchange format (IEF) such as Javascript object notation (JSON), XML, YAML, or BSON. The converted specification is then stored in a database farm within a data aggregator (e.g., data aggregator 226).

Based on a member of converted specifications, the specification engine 216 may access the historical details of the business requirements or features ordered temporally. For instance, if a product specification was created in April and later updated in December of the same year, the architects may have re-architected their systems in June of that year and January of the following year, respectively. The data associated with the product design, e.g., the UML documents and the data associated with, the product spec, the Product Requirements Documents may be retrieved from the Artifact Manager 214 and the Activity manager 212. Since both these modules store their data with a time-stamp, getting a temporally-order data at the historical data on the product specification and product description is feasible.

A code engine 218 is configured to abstract the code by generating a UML diagram of the particular piece of code. The UML diagram may be referred to as a "design". The design may be time-stamped to indicate when it was generated from code as it existed at that point in time. It is this time-stamped design and the design managed by the specification engine 216 that the n-trace engine 222 uses to connect the product specification with the product design.

A quality engine 220 is configured to provide recommendations of testing schemes to use to test a particular piece of code. To make recommendations, the quality engine 220 is configured to access testing reports corresponding to a particular piece of code. The testing reports may be generated by testing suites in TestNG, Selenium, JUnit, Emma, PMD, or FindBugs for code quality, defect density, or orthogonal defect classification.

Based on the testing reports, the specification, the converted specification, the code, and the design, the quality engine 220 is able to recommend tests to be performed on a target piece of code. To illustrate, the quality engine 220 may be focused on a particular Java class where the previous version of the class had five public methods and two private methods and the current version of the class has ten public methods and six private methods. The previous version of the code may have had JUnit test cases for the five public methods and two private methods. This test data would be present in the previous testing-reports available through the Continuous Integration, tools like Jenkins and Hudson reports. Using the data from the artifact manager 214, the quality engine 220 predicts that the following are the elements in the new code that need to be tested: five newly included public methods, and four newly included private methods.

The n-trace engine 222 is configured to access the converted specification generated by the specification engine 216 and the design generated by design engine 218. All designs would have a ERD (Engineering Requirements Document) associated with it. All ERDs would have PRDs (Product Requirement Document) associated with them. Thus n-trace engine 222 connects a design's UML diagrams with its specification's FSM (Finite State Machines). The n-trace engine 222 is configured to determine which portions of the specification trace to a particular piece of code and which pieces of code trace to a portion of a specification. Based on the determinations, a time-graph may be generated. The time-graph sequentially orders the events occurring in connection with the piece of code or the portion of the specification. The time-graph has time in x-axis and number of changes in y-axis. When a cursor traverses a dot on the graph, the design of the system at that specific point of time is rendered. The events may be pulled from the data stored by the actor manager 210, the activity manager 212, and/or the artifact manager 214.

A data forager 224 is configured to suggest testing methodologies for a particular piece of code based on statistical measurements performed on historic data. Due to limited testing resources and schedule slippage, certain tests may be skipped before the code is deployed. Examples of testing that may be performed on code before deployment include, for example, feature testing, end-to-end testing, application program interface (API) testing, code coverage testing, combinatorial testing, fault injection testing, security testing, sanity testing, regression testing, load testing, stress testing, and recovery testing.

A data aggregator 226 is configured to connect and collate data from each of the managers 210, 212, and 214 and the results generated by our engines 216, 218, and 220. The three managers create data but each in unaware of the existence of the other two managers. The data aggregator 226 is to collate and analyze all the data.

Figure 3:
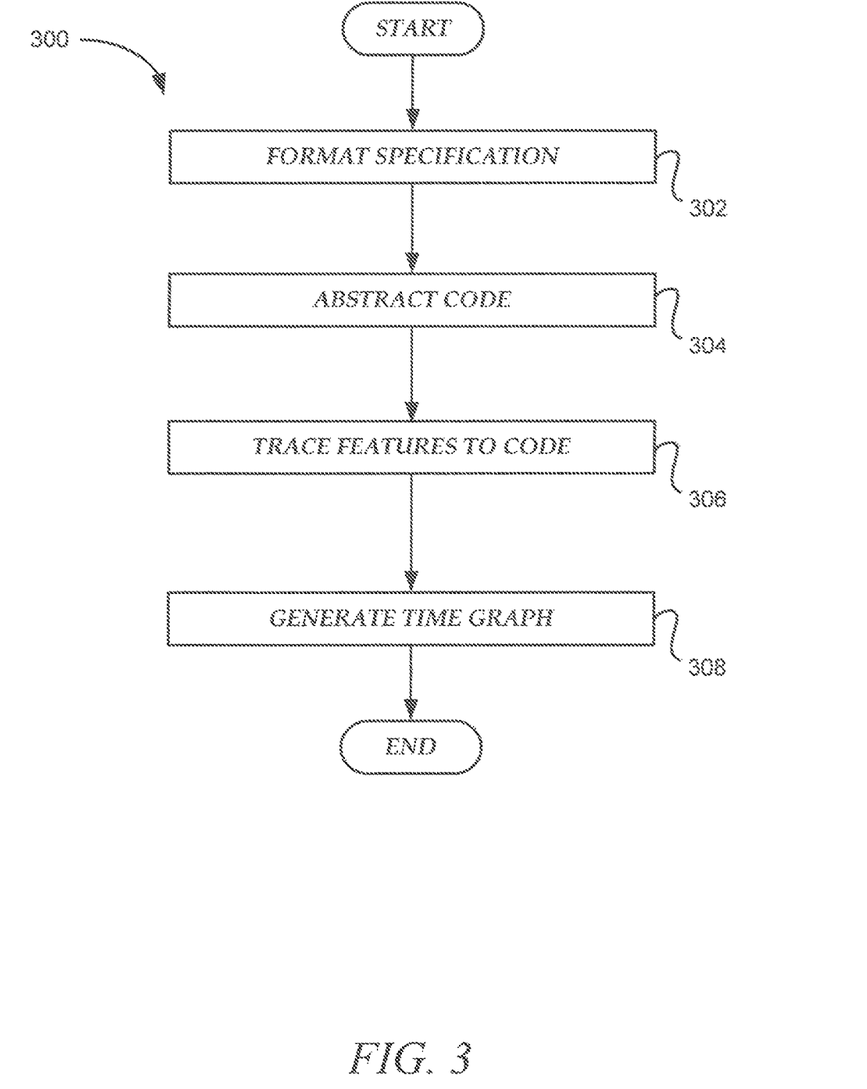
FIG. 3 is a flowchart illustrating an example method, according to various embodiments.

FIG. 3 is a flowchart illustrating an example method 300, according to various embodiments. In an operation 302, the specification is formatted. In an operation 304, the code is abstracted to generate a design, in an operation 306, features identified in the specification are traced to portions of the code. In an operation 308, a time-graph is generated based on the code.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented, modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output, devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g. within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing-system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 4:
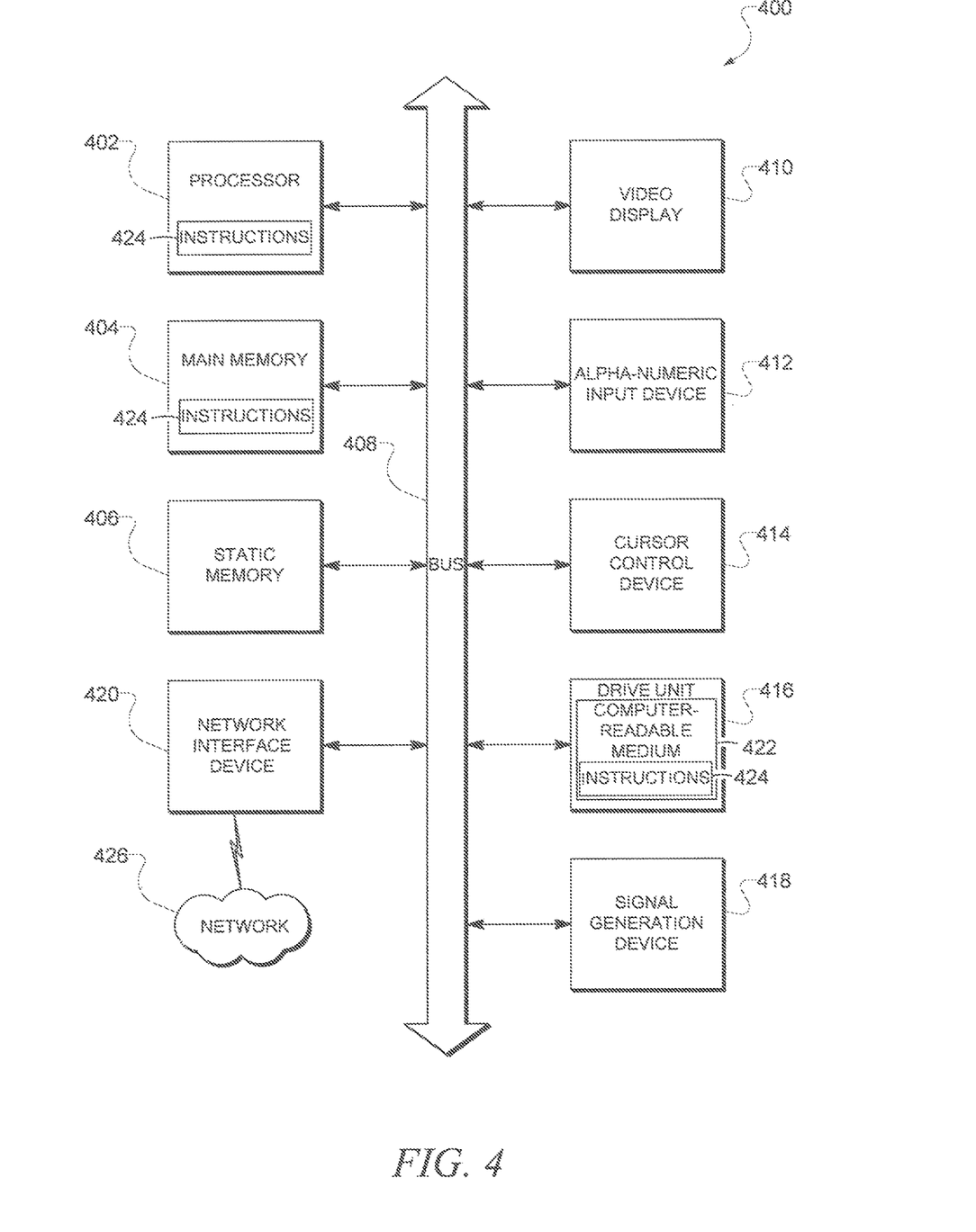
FIG. 4 is a diagrammatic representation of machine in the example form of a computer system within which a set of instructions, for causing the machine to perform any one or more of the methodologies discussed herein, may be executed.

FIG. 4 is a block diagram of machine in the example form of a computer system 400 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard or a touch-sensitive display screen), a user interface (UI) navigation device 414 (e.g., a mouse), a disk drive unit 416, a signal generation device 418 (e.g., a speaker) and a network interface device 420.

Machine-Readable Medium

The disk drive unit 416 includes a machine-readable medium 422 on which is stored one or more sets of instructions and data structures (e.g., software) 424 embodying or utilized by any one or more of the methodologies or functions described herein. The instructions 424 may also reside, completely or at least partially, within the main memory 404 and/or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions far execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 424 may further be transmitted or received over a communications network 426 using a transmission medium. The instructions 424 may be transmitted using the network interface device 420 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments. It will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that, any arrangement calculated to achieve the same purpose may be substituted for the specific embodiments shown. This disclosure is intended to cover any and all adaptations or variations of various embodiments. Combinations of the above embodiments, and other embodiments not specifically described, herein, will be apparent to those of skill in the art upon reviewing the above description.

What is claimed is:

1. A system comprising: a specification engine, comprising one or more processors, configured to convert a specification, describing one or more features included in software code, into an information exchange format; the specification engine further configured to store the specification in the information exchange format in a database; the specification engine further configured to access historical details of features included in the software code ordered temporally, based on a plurality of specifications that have been converted into information exchange formats and stored in the database, to produce a temporally ordered converted specification that describes historical details of the one or more features of the software code, organized temporally; a code engine, comprising one or more processors, configured to abstract the software code corresponding to the temporally ordered converted specification into a time-stamped design; and an n-trace engine, comprising one or more processors, configured to access the temporally ordered converted specification and the time-stamped design to determine which portions of the specification trace to a particular piece of the software code and which pieces of the software code trace to a portion of a specification, based on connecting temporally-ordered data in the temporally ordered converted specification and time-stamped data of the time-stamped design; the n-trace engine further configured to generate a first time-graph, based on the determination of which portions of the specification trace to a particular piece of the software code, that sequentially orders events occurring in connection with a portion of the code; the n-trace engine further configured to generate a second time-graph based on which pieces of the software code trace to a portion of the specification, that sequentially orders events occurring in connection with a portion of the specification; a data forager, comprising one or more processors, configured to suggest testing methodologies for a particular piece of the software code based upon the historical details; and wherein the system further deploys the software code on a web platform, a mobile platform, or a console platform based upon the suggested testing methodologies.

2. The system of claim 1, further comprising a rendition engine, comprising one or more processors, configured to generate a visual representation or reproduction of the software code.

3. The system of claim 1, further comprising an actor manager, comprising one or more processors, configured to manage data about product managers, developers, and quality assurance engineers who act on the software code or specification.

4. The system of claim 1, further comprising an activity manager, comprising one or more processors, configured to manage data about actions performed on the software code or the specification.

5. The system of claim 1, further comprising an artifact manager, comprising one or more processors, configured to manage artifacts and data describing artifacts.

6. The system of claim 1, further comprising a quality engine, comprising one or more processors, configured to provide recommendations of testing schemes to use to test a particular piece of code by determining which elements in the particular piece of the software code are new code that need to be tested based on the temporally ordered converted specification and the time-stamped design.

7. The system of claim 1, the data forager further configured to suggest the testing methodologies for the particular piece of the software code based on statistical measurements performed on historic data.

8. The system of claim 1, further comprising a data aggregator, comprising one or more processors, configured to collect and collate data collected by one or more managers.

9. The system of claim 1, wherein the time graph comprises time in x-axis and number of changes in y-axis.

10. The system of claim 9, wherein the time-graph comprises a cursor that, when traversing the graph, the design of the system at that specific point of time is caused to be rendered.

11. The system of claim 1, wherein the code is written in an object-oriented language or a functional language.

12. The system of claim 11, wherein the code written in the object-oriented language is used to generate a uniform mark-up language (UML) diagram or to update an existing UML diagram.

13. The system of claim 11, wherein the software code is used to generate a finite state machine.

14. The system of claim 11, wherein the software code is used to generate a UML state diagram.

15. The system of claim 1, wherein the information exchange format includes at least one of a group comprising: Javascript object notation (JSON), XML, YMAL, and BSON.

16. The system of claim 1, wherein the temporally ordered converted specification is organized temporally based on time-stamp data associated with the plurality of specifications that have been converted into information exchange formats.

17. The system of claim 1, wherein the time-stamp data indicates when the time-stamped design was generated from the software code as it existed at that point in time.

18. A computer-implemented method, executed by one or more computer processors, comprising: converting a specification, describing one or more features included in software code, into an information exchange format; storing the specification in the information exchange format in a database; accessing historical details of features included in the software code ordered temporally, based on a plurality of specifications that have been converted into information exchange formats and stored in the database, to produce a temporally ordered converted specification that describes historical details of the one or more features of the software code, organized temporally; abstracting the software code corresponding to the temporally ordered converted specification into a time-stamped design; accessing the temporally ordered converted specification and the time-stamped design to determine which portions of the specification trace to a particular piece of the software code and which pieces of the software code trace to a portion of the specification, based on connecting temporally-ordered data in the temporally ordered converted specification and time-stamped data of the time-stamped design; generating a first time-graph, based on the determination of which portions of the specification trace to a particular piece of the software code, that sequentially orders events occurring in connection with a portion of the code; generating a second time-graph, based on a determination of which pieces of the software code trace to a portion of the specification, that sequentially orders events occurring in connection with a portion of the specification suggesting testing methodologies for a particular piece of the software code based upon the historical details; and wherein the software code is deployed on a web platform, a mobile platform, or a console platform based upon the suggested testing methodologies.

19. A non-transitory computer-readable medium having instructions embodied thereon that when executed by one or more processors, cause the one or more processors to perform operations comprising: converting a specification, describing one or more features included in software code, into an information exchange format; storing the specification in the information exchange format in a database; accessing historical details of features included in the software code ordered temporally, based on a plurality of specifications that have been converted into information exchange formats and stored in the database, to produce a temporally ordered converted specification that describes historical details of the one or more features of the software code, organized temporally; abstracting the software code corresponding to the temporally ordered converted specification into a time-stamped design; accessing the temporally ordered converted specification and the time-stamped design to determine which portions of the specification trace to a particular piece of the software code and which pieces of the software code trace to a portion of the specification, based on connecting temporally-ordered data in the temporally ordered converted specification and time-stamped data of the time-stamped design; generating a first time-graph, based on the determination of which portions of the specification trace to a particular piece of the software code, that sequentially orders events occurring in connection with a portion of the code; generating a second time-graph, based on a determination of which pieces of the software code trace to a portion of the specification, that sequentially orders events occurring in connection with a portion of the specification suggesting testing methodologies for a particular piece of the software code based upon the historical details; and wherein the software code is deployed on a web platform, a mobile platform, or a console platform based upon the suggested testing methodologies.

\* \* \* \* \*

UNITED STATES PATENT AND TRADEMARK OFFICE
CERTIFICATE OF CORRECTION

PATENT NO. : 9,747,194 B2
APPLICATION NO. : 13/663956
DATED : August 29, 2017
INVENTOR(S) : Shrivatsan Navalpakkam Rajagopalan It is certified that error appears in the above-identified patent and that said Letters Patent is hereby corrected as shown below:

On the Title Page

In item (57), in Column 2, in "Abstract", Line 4, delete "convened" and insert -- converted --, therefor.

Signed and Sealed this
Fifteenth Day of May, 2018

Andrei Iancu
*Director of the United States Patent and Trademark Office*